US010200229B2

(12) United States Patent
Yu et al.

(10) Patent No.: US 10,200,229 B2
(45) Date of Patent: Feb. 5, 2019

(54) METHOD AND APPARATUS FOR EXTRACTING RESOURCE BLOCK FROM SIGNAL

(71) Applicant: Telefonaktiebolaget LM Ericsson (publ), Stockholm (SE)

(72) Inventors: Shaowei Yu, Beijing (CN); Peng Li, Beijing (CN); Feng Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 8 days.

(21) Appl. No.: 15/534,075

(22) PCT Filed: Jan. 16, 2015

(86) PCT No.: PCT/CN2015/070892
§ 371 (c)(1),
(2) Date: Jun. 8, 2017

(87) PCT Pub. No.: WO2016/112537
PCT Pub. Date: Jul. 21, 2016

(65) Prior Publication Data
US 2017/0346669 A1    Nov. 30, 2017

(51) Int. Cl.
*H04L 27/26* (2006.01)
*H04W 56/00* (2009.01)

(52) U.S. Cl.
CPC ...... *H04L 27/2659* (2013.01); *H04L 27/2647* (2013.01); *H04L 27/2669* (2013.01); *H04W 56/001* (2013.01)

(58) Field of Classification Search
CPC .............. H04L 27/265; H04L 27/2655; H04L 25/03159; H04L 27/2647; H04L 27/2659;
(Continued)

(56) References Cited

U.S. PATENT DOCUMENTS 8,345,804 B2    1/2013  Song et al.
8,457,076 B2    6/2013  Kwon et al.
(Continued)

FOREIGN PATENT DOCUMENTS

CN    103748949 A    4/2014
EP      2099188 A2    9/2009
(Continued)

OTHER PUBLICATIONS

De Figueiredo, Felipe, A. P. et al., "Multi-Stage Based Cross-Correlation Peak Detection for LTE Random Access Preambles", Revista Telecommunicacoes, vol. 15, Issue 2, University of Brasilia Law School, Study Group on Telecommunications Law, pp. 21-27 (Year: 2013).*

(Continued)

*Primary Examiner* — Michael Thier
*Assistant Examiner* — Prince A Mensah
(74) *Attorney, Agent, or Firm* — Sage Patent Group (57) ABSTRACT

The embodiments disclose a method in a base station for extracting a resource block at a frequency band from a signal received from a terminal device in a radio communication system employing OFDM. The method comprising: removing a CP portion corresponding to the resource block from the signal; for each of a predetermined number of successive symbols in the signal after the CP portion corresponding to the resource block has been removed, performing a FFT of the symbol, extracting a frequency domain signal corresponding to the frequency band from the FFT of the symbol, performing an IFFT on the extracted frequency domain signal to yield a time domain signal, and storing the time domain signal to form a time sequence by concatenation; performing a FFT of the stored time sequence; and extracting subcarriers corresponding to the resource block from the FFT of the stored time sequence.

5 Claims, 11 Drawing Sheets

(58) Field of Classification Search
CPC .......... H04L 27/2669; H04W 72/0446; H04W 72/0453; H04W 74/0833; H04W 56/001
See application file for complete search history.

(56) References Cited

U.S. PATENT DOCUMENTS

| | | |
|---|---|---|
| 8,634,288 B2 | 1/2014 | McGowan et al. |
| 2007/0171889 A1 | 7/2007 | Kwon et al. |
| 2008/0310561 A1 | 12/2008 | Song et al. |
| 2011/0317640 A1* | 12/2011 | Kawamura ............. H04J 13/00 370/329 |
| 2012/0307743 A1* | 12/2012 | McGowan ............ H04L 27/265 370/329 |
| 2014/0177563 A1 | 6/2014 | McGowan et al. |
| 2015/0208425 A1* | 7/2015 | Caretti .............. H04W 72/0426 370/336 |

FOREIGN PATENT DOCUMENTS

| | | |
|---|---|---|
| WO | 2008156588 A1 | 12/2008 |
| WO | 2012164422 A1 | 12/2012 |

OTHER PUBLICATIONS

International Search Report and Written Opinion for International Patent Application No. PCT/CN2015/070892, dated Oct. 13, 2015, 11 pages.

* cited by examiner

METHOD AND APPARATUS FOR EXTRACTING RESOURCE BLOCK FROM SIGNAL

This application is a 35 U.S.C. § 371 national phase filing of International Application No. PCT/CN2015/070892, filed Jan. 16, 2015, the disclosure of which is incorporated herein by reference in its entirety.

TECHNICAL FIELD

The present technology relates to the field of communication, particularly to a method in a base station for extracting a resource block at a frequency band from a signal received from a terminal device in a radio communication system employing Orthogonal Frequency Division Multiplexing (OFDM). The technology also relates to an apparatus and a computer readable storage medium for performing the method.

BACKGROUND

The $3^{rd}$ generation partnership project (3GPP) Long Term Evolution (LTE) is a standard for wireless communication of high-speed data for mobile phones and data terminals. The main advantages with LTE are high throughput, low latency, plug and play, frequency-division duplexing (FDD) and time-division duplexing (TDD) in the same platform, an improved end-user experience and a simple architecture resulting in low operating costs.

Figure 1:
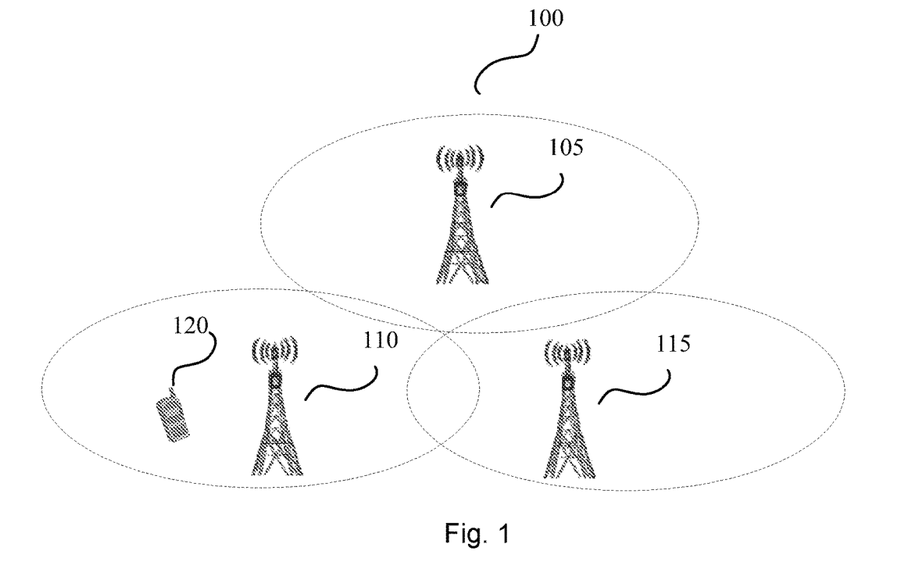
FIG. 1 illustrates an exemplary wireless communication system.

A generic setup in a wireless communication system 100 such as the LTE system is illustrated in FIG. 1. In the system 100, base stations such as 105,110 and 115 serve user equipments (UEs). Specifically, the UEs are located in an area (cell, marked with dashed line in FIG. 1) surrounding a respective base station. Here, the base station 110 serves the UE 120.

The communication between a base station and a UE is usually synchronized to occur at predetermined time slots. Since the UE may be mobile, they may move from an area of one base station to an area of a neighboring base station. For example, the UE 120 in FIG. 1 may have previously been served by the base station 105, and has recently moved from the cell where it was served by the base station 105, to the cell where it is served by the base station 110. In this case (i.e. when entering a new cell) as well as when a UE initiates connecting to the wireless communication system 100, there is a procedure involving message exchange between the UE and the base station, for establishing and synchronizing the communication there-between.

Figure 2:
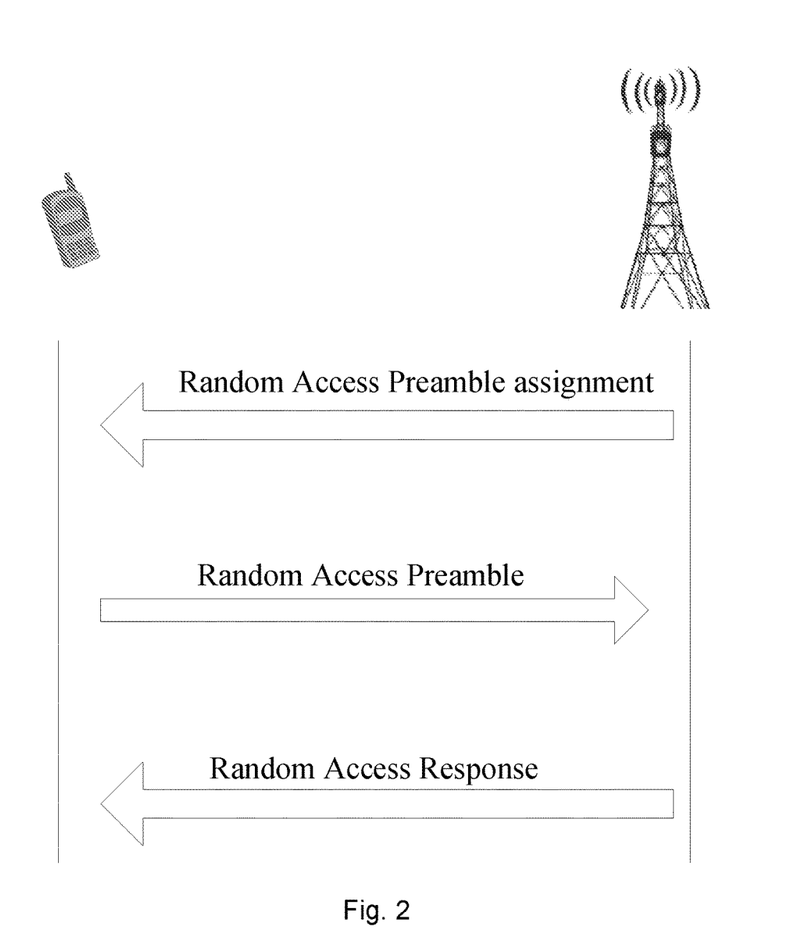
FIG. 2 schematically illustrates a process to establish and synchronize the communication between the UE and the base station.
Figure 3:
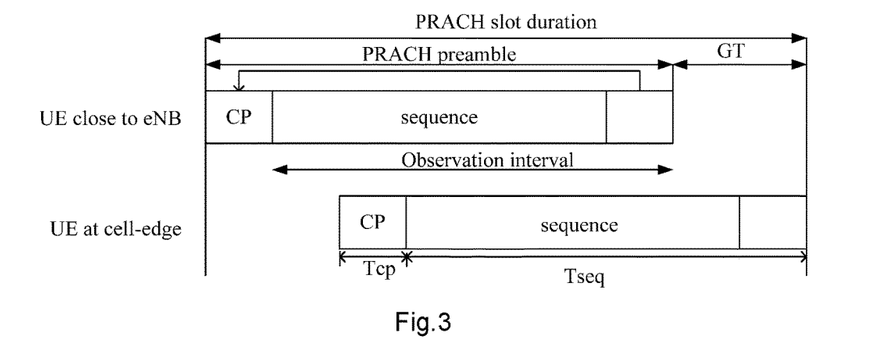
FIG. 3 schematically illustrates a format of the RACH preamble.

Generally, the communication establishment and synchronization between the UE and the base station are accomplished through the random access procedure as illustrated in FIG. 2. Firstly, the base station assigns one random access channel (RACH) preamble to the UE. Then, the UE transmits a random access request signal to the base station. The random access request signal contains the assigned RACH preamble, a timing alignment instruction to synchronize subsequent uplink (from the UE to the base station) transmissions. As illustrated in FIG. 3, the RACH preamble includes a cyclic prefix (RACH CP) portion lasting $T_{CP}$ and a sequential portion $T_{SEQ}$. The base station receiving the request signal from the UE is capable to estimate the timing offset that the UE has to make in order to achieve a true synchronization with the base station for uplink traffic. Further, the base station sends a signal directed to the UE in response, the signal indicates the timing adjustment so that later uplink messages are synchronized.

Figure 4:
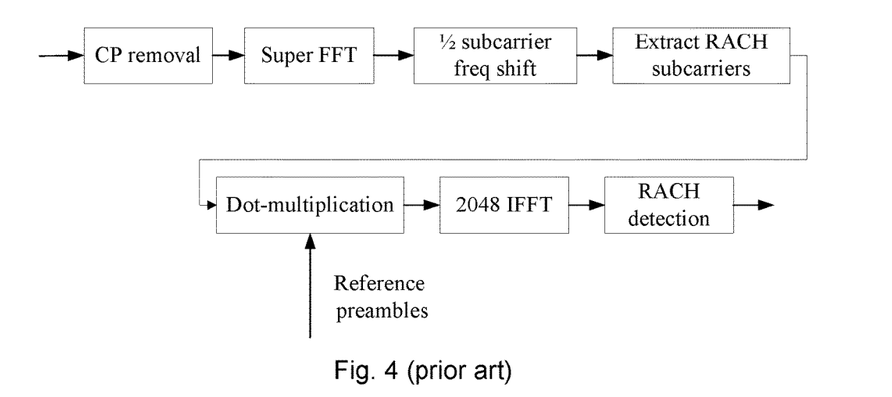
FIG. 4 schematically illustrates a conventional apparatus for extracting RACH preamble from an uplink signal.

One conventional manner for the base station to extract the RACH preamble from the request signal is proposed in the US Application No. 20070171889. As illustrated in FIG. 4, one super Fast Fourier Transformation (FFT) is used to extract $N_{ZC}$ preamble subcarriers after cyclic prefix (CP) removal. Then an Inverse Fast Fourier Transformation (IFFT) is done on the output of dot-multiplication between the extracted signal and a reference sequence to generate a time-domain correlation sequence. Then, the Power Delay Profile (PDP) of the time-domain correlation sequence is computed. Finally, signature detection is done on the PDP to get preamble ID and uplink timing offset. In this proposal, a super FFT is performed on the 1 ms RACH signal, which results in a high calculation complexity and long processing delay.

SUMMARY

It's an object of the present disclosure to resolve or alleviate at least one of the problems mentioned above.

A first aspect of the present disclosure relates to a method in a base station for extracting a resource block at a frequency band from a signal received from a terminal device in a radio communication system employing OFDM. The method comprises: removing a CP portion corresponding to the resource block from the signal; for each of a predetermined number of successive symbols in the signal after the CP portion corresponding to the resource block has been removed, performing a FFT of the symbol, extracting a frequency domain signal corresponding to the frequency band from the FFT of the symbol, performing an IFFT on the extracted frequency domain signal to yield a time domain signal, and storing the time domain signal to form a time sequence by concatenation; performing a FFT of the stored time sequence; and extracting subcarriers corresponding to the resource block from the FFT of the stored time sequence.

A second aspect of the present disclosure relates to a method in a base station for extracting a resource block at a frequency band from a signal received from a terminal device in a radio communication system employing OFDM. The method comprises: removing the CP portion corresponding to the resource block from the signal; performing a predetermined number of sampling point shifts on the signal after the CP portion corresponding to the resource block has been removed; for each of a predetermined number of successive symbols in the signal, performing a FFT of a symbol, extracting a frequency domain signal corresponding to the frequency band from the FFT of the symbol, performing an IFFT on the extracted frequency domain signal to yield a time domain signal, adjusting phase of the time domain signal based on the sampling point shifts to smooth the phase discontinuity between the successive symbols, and storing the adjusted time domain signal to form a time sequence by concatenation; performing a FFT of the stored time sequence; and extracting subcarriers corresponding to the resource block from the FFT of the stored time sequence.

A third aspect of the present disclosure relates to a computer readable storage medium which stores instructions which, when run on a base station, cause the base station to perform the steps of the method above.

A fourth aspect of the present disclosure relates to an apparatus configured to extract a resource block at a frequency band from a signal received in a base station from a terminal device in a radio communication system employing OFDM. The apparatus comprises a first removing unit, a first FFT unit, a first extracting unit, a first IFFT unit, a first storing unit, a second FFT unit and a second extracting unit. The first removing unit is adapted to remove a CP portion corresponding to the resource block from the signal; The first FFT unit is adapted to perform a FFT of each of a predetermined number of successive symbols in the signal; The first extracting unit is adapted to extract a frequency domain signal corresponding to the frequency band from the FFT of the symbol; The first IFFT unit is adapted to perform an IFFT on the extracted frequency domain signal to yield a time domain signal; The first storing unit is adapted to store the time domain signal for the each of the predetermined number of successive symbols to form a time sequence by concatenation. The second FFT unit adapted to perform a FFT of the stored time sequence; and the second extracting unit is adapted to extract subcarriers corresponding to the resource block from the FFT of the stored time sequence.

A fifth aspect of the present disclosure relates to an apparatus configured to extract a resource block at a frequency band from a signal received in a base station from a terminal device in a radio communication system employing OFDM. The method comprises a second removing unit, a shifting unit, a third FFT unit, a third extracting unit, a third IFFT unit, an adjusting unit, a second storing unit, a fourth FFT unit and a fourth extracting unit. The second removing unit is adapted to remove the CP portion corresponding to the resource block from the signal; The shifting unit is adapted to perform a predetermined number of sample shifts on the signal; The third FFT unit is adapted to perform a FFT of each of a predetermined number of successive symbols in the signal; The third extracting unit is adapted to extract a frequency domain signal corresponding to the frequency band from the FFT of the symbol; The third IFFT unit is adapted to perform an IFFT on the extracted frequency domain signal to yield a time domain signal; The adjusting unit is adapted to adjust phase of the time domain signal based on the sampling points shifts to smooth the phase discontinuity between the successive symbols; The second storing unit is adapted to store the adjusted time domain signal for the each of the predetermined number of successive symbols to form a time sequence by concatenation; The fourth FFT unit is adapted to perform a FFT of the stored time sequence; and the fourth extracting unit is adapted to extracting subcarriers corresponding to the resource block from the FFT of the stored time sequence.

A sixth aspect of the present disclosure relates to an apparatus configured to extract a resource block at a frequency band from a signal received in a base station from a terminal device in a radio communication system employing OFDM. The apparatus comprises a processor and a memory. The memory contains instructions executable by the processor whereby the apparatus is operative to: remove a CP portion corresponding to the resource block from the signal; for a predetermined number of successive symbols in the signal after the CP portion corresponding to the resource block has been removed, perform a FFT of a symbol, extract a frequency domain signal corresponding to the frequency band from the FFT of the symbol, perform an IFFT on the extracted frequency domain signal to yield a time domain signal, and store the time domain signal to form a time sequence by concatenation; perform a FFT of the stored time sequence; and extract subcarriers corresponding to the resource block from the FFT of the stored time sequence.

A seventh aspect of the present disclosure relates to an apparatus configured to extract a resource block at a frequency band from a signal received in a base station from a terminal device in a radio communication system employing OFDM. The apparatus comprises a processor and a memory. The memory contains instructions executable by the processor whereby the apparatus is operative to: remove the CP portion corresponding to the resource block from the signal; perform a predetermined number of sampling point shifts on the signal after the CP portion corresponding to the resource block has been removed; for a predetermined number of successive symbols in the signal, perform a FFT of a symbol, extract a frequency domain signal corresponding to the frequency band from the FFT of the symbol, perform an IFFT on the extracted frequency domain signal to yield a time domain signal, adjust phase of the time domain signal based on the sampling point shifts to smooth the discontinuity between the successive symbols, and store the adjusted time domain signal to form a time sequence by concatenation; perform a FFT of the stored time sequence; and extract subcarriers corresponding to the resource block from the FFT of the stored time sequence.

In the embodiments, through partitioning the signal received from the UE to a predetermined number of successive symbols, the base station can extract the resource block from the signal by performing a plurality of symbol-level FFT instead of a super FFT. In this way, the base station doesn't necessarily find a large storage space to store the whole signal for performing a super FFT. Instead, it is only required to store a subset of the signal, i.e. one symbol for performing the symbol-level FFT. In addition, the calculation complexity of symbol-level FFTs is significantly lower than that of the super FFT, the processing efficiency is thus improved.

BRIEF DESCRIPTION OF THE DRAWINGS

The technology will be described, by way of example, based on embodiments with reference to the accompanying drawings, wherein.

DETAILED DESCRIPTION

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as base station, it should be understood that the embodiments are not limited to those specific terms but may be applied to all similar entities, such as access point, macro base station, femto base stations, Core Network (CN), NodeB, eNodeB etc.

Embodiments herein will be described below with reference to the drawings.

Figure 5:
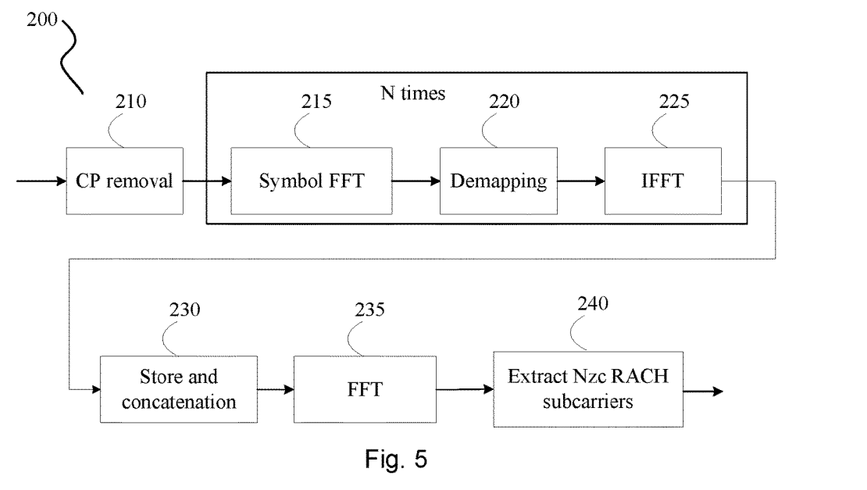
FIG. 5 schematically illustrates an apparatus for extracting a resource block at a frequency band from the uplink signal according to an embodiment.

FIG. 5 schematically illustrates an apparatus 200 for extracting a resource block at a frequency band from a signal received in a base station from a terminal device in a radio communication system employing OFDM according to an embodiment. Typically, the signal can contain a plurality of resource blocks, each of which is carried at different frequency bands of the signal. Herein, for purpose of clarity, the RACH preamble is used as an example of the resource block to set forth the embodiments of the present disclosure. In addition, by way of example, the present disclosure uses LTE system as an exemplary radio communication network to describe the embodiments. However it should be appreciated that the embodiments are applicable to other radio communication networks that employs the OFDM. The apparatus 200 can be either implemented independently or integrated into the base station.

The terminal device may be any device intended for accessing services via an access network and configured to communicate over the access network. For instance, the terminal device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The terminal device may be a portable, pocket-storable, hand-held, computer-comprised, or vehicle-mounted mobile device, enabled to communicate voice and/or data. Herein, the terms terminal device and UE can be used interchangeably.

As illustrated in FIG. 5, the apparatus 500 comprises a first removing unit 210, a first FFT unit 215, a first extracting unit 220, a first IFFT unit 225, a first storing unit 230, a second FFT unit 235 and a second extracting unit 240. Now the functions of the individual units will be discussed with reference to FIG. 5.

The first removing unit 210 is adapted to remove a CP portion corresponding to the resource block from the signal. Taking the RACH preamble as example, in the LTE system, the RACH preamble has the following formats:

| Preamble format | $T_{CP}$ | $T_{SEQ}$ |
|---|---|---|
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |

RACH slot duration is 1 ms as shown as FIG. 3. When the bandwidth of the signal is 20 MHz and RACH format 0 is used, the RACH preamble includes 24567 $T_s$ $T_{SEQ}$ and $3168 \cdot T_s$ $T_{CP}$, under 30.72 MHz sampling rate. The first removing unit 210 will remove the CP portion lasting $3168 \cdot T_s$ of the RACH preamble from the signal, i.e. removing 3168 sampling point corresponding to the CP portion from the signal.

The first FFT unit 215 is adapted to perform a FFT of each of a predetermined number of successive symbols in the signal. Specifically, after the CP portion corresponding to the resource block is removed from the signal, the apparatus 200 may partition the signal into a predetermined number of successive symbols, then the first FFT unit 215 can perform the symbol-level FFT on each of the symbols. In an embodiment, the number of the successive symbols can be set such that each of the successive symbols contains sampling points in an amount of powers of two (e.g. $2^\alpha$) or powers of two multiplying powers of three and/or powers of five (e.g. $2^\alpha \cdot 3^\beta$, $2^\alpha \cdot 5^\gamma$ or $2^\alpha \cdot 3^\beta \cdot 5^\gamma$), since it is convenient for the symbol to be performed FFT.

For example, for the RACH preamble with the format 0 under 30.72 MHz sampling rate, the sequential portion of the RACH preamble has 24576 sampling points in the time domain of the signal. In this case, the number of the successive symbols can be set to 12, since, in this way, each of the successive symbols will contain 2048 (=24576/12), i.e. $2^{11}$ sampling points. As such, the first FFT unit 215 will perform a 2048-points FFT whenever receiving 2048 sampling points and keep do this for 12 times. Alternatively, the number of the successive symbols also can be set 24, 48 or the like; accordingly each of the successive symbols will contain sampling points of 1024, 512 or the like. For example, if the number of the successive symbols is set to 24, then the first FFT unit 215 will perform 1024-points FFT whenever receiving 1024 sampling points and keep do this for 24 times.

For another example, for the RACH preamble with the format 0 under 19.2 MHz sampling rate, the sequential portion of the RACH preamble has 15360 sampling points in the time domain of the signal. In this case, the number of the successive symbols can be set to 12, since, in this way, each of the successive symbols will contain 1280 (=15360/12), i.e. $2^8 \cdot 5^1$ sampling points. As such, the first FFT unit 215 will perform a 1280-points FFT whenever receiving 1280 sampling points and keep do this for 12 times.

After one of the successive symbols is performed the FFT by the first FFT unit 215, the first extracting unit 220 is adapted to extract a frequency domain signal corresponding to the frequency band at which the resource block is carried, from the FFT of the symbol. Since each of the successive symbols contains the resource block, the first extracting unit 220 will extract the frequency domain signal corresponding to the frequency band from each of the symbols. Taking the RACH preamble as example, the RACH preamble consists of 839 subcarriers with the subcarrier interval of 1.25 KHz, hence the frequency band carrying the RACH preamble is 839*1.25 KHz=1.0488 MHz. In order to extract the frequency domain signal that covers the frequency band carrying the RACH preamble, the frequency band for the frequency domain signal should be not less than 1.0488 MHz. When each of the successive symbols has 2048 sampling points and the sampling rate is 30.72 MHz as discussed above, the subcarrier interval for the symbol is 30.72 MHz/2048=15 KHz. In this case, the frequency domain signal should at least contain $(1.0488 \times 10^3)/15 \approx 70$ subcarriers. Additionally or alternatively, for ease of the subsequent IFFT on the extracted frequency domain signal, it is desirable for the signal to contain the subcarriers in an amount of powers of two (e.g. $2^\alpha$) or powers of two multiplying powers of three and/or powers of five (e.g. $2^\alpha \cdot 3^\beta$, $2^\alpha \cdot 5^\gamma$ or $2^\alpha \cdot 3^\beta \cdot 5^\gamma$). Hence, the frequency domain signal should contain at least 128 subcarriers, and accordingly the frequency band for the extracted frequency domain signal is 128*15 KHz=1.92 MHz.

The first IFFT unit 225 is adapted to perform an IFFT on the frequency to domain signal extracted by first extracting unit 220 to yield a time domain signal. Specifically, the first IFFT unit 225 should perform the IFFT on the extracted frequency domain signal using subcarriers that contains the subcarriers corresponding to the resource block. Taking the RACH preamble as example, at least 128 subcarriers are needed to cover the frequency band of the resource block as described above; the first IFF unit 225 may thus perform 128-subcarriers IFFT on each of the extracted frequency domain signals.

After being processed by the first FFT unit 215, the first extracting unit 220 and the first IFFT unit 225 sequentially, each of the successive symbols is transformed to a corresponding time domain signal. The first storing unit 230 is adapted to store the corresponding time domain signal for each of the successive symbols and sequentially concatenate the time domain signals to form a time sequence.

The second FFT unit 235 is adapted to perform a FFT of the stored time sequence. For example, if the predetermined number of the successive symbols is 12, then the time sequence will concatenate 12 corresponding time domain signals. If each of time domain signals is yielded by performing 128-subcarriers IFFT as described above, the time domain signal will have 128 sampling points in time domain. As such the second FFT unit 235 will perform 128*12=1536 points FFT on the time sequence.

Then, the second extracting unit 240 is adapted to extract subcarriers corresponding to the resource block from the FFT of the stored time sequence.

Through partitioning the signal received from the UE to a predetermined number of successive symbols, the base station can extract the resource block from the signal by performing a plurality of symbol-level FFT instead of a super FFT. In this way, the base station doesn't necessarily find a large storage space to store the whole signal for performing a super FFT. Instead, it is only required to store a subset of the signal, i.e. the symbol for perform the symbol-level FFT. In addition, the calculation complexity of symbol-level FFTs is significantly lower than that of the super FFT, the processing efficiency is thus improved.

Figure 7A:
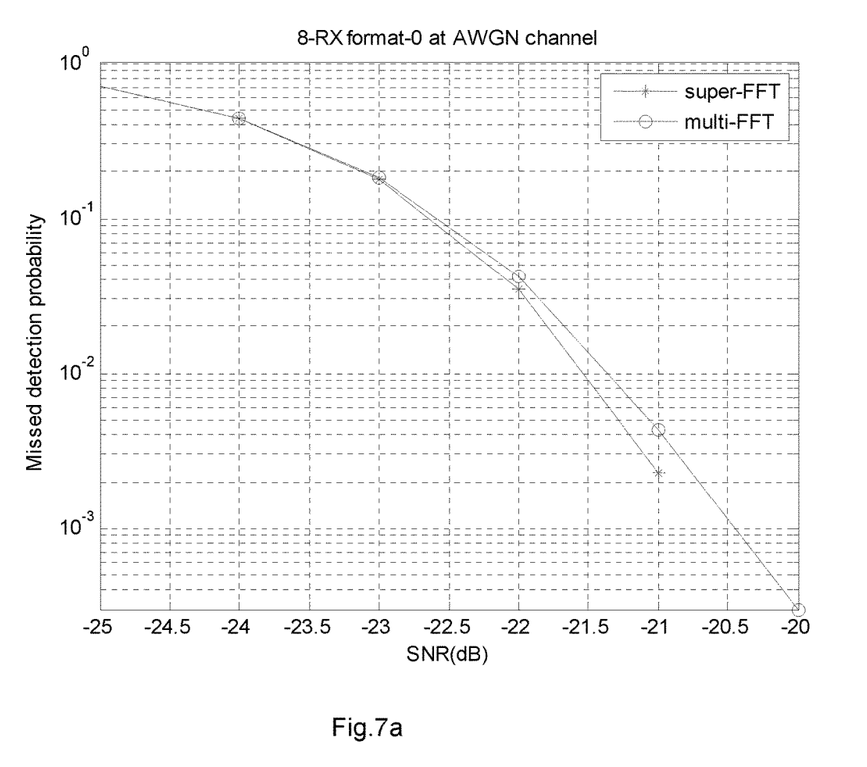
FIG. 7a-7b is a graph comparing performance of a conventional apparatus and performance of an apparatus according to an embodiment of the present disclosure.
Figure 7B:
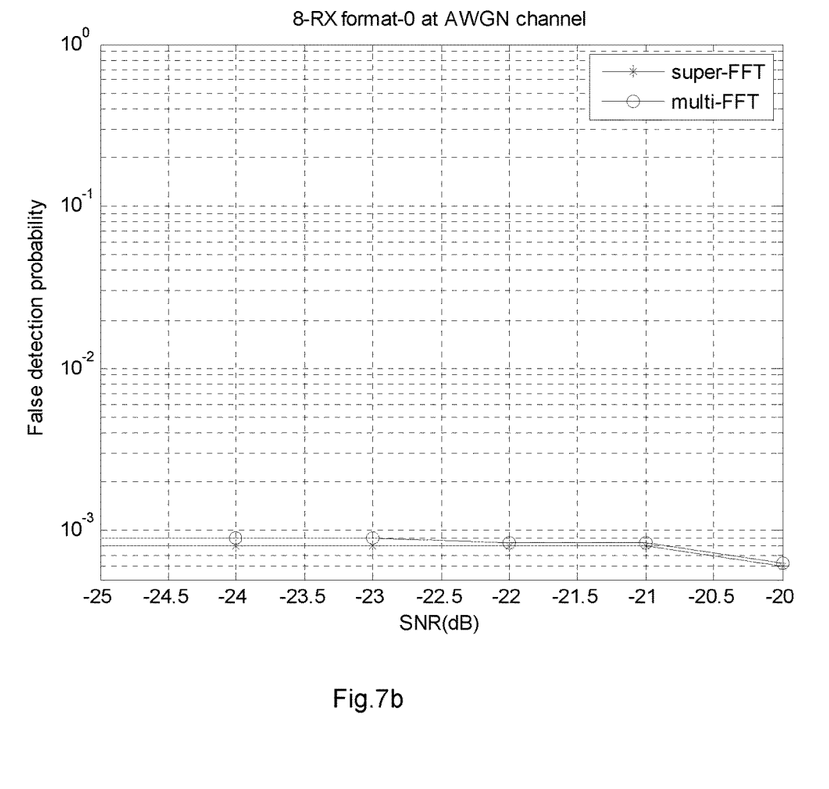

Meanwhile, FIG. 7a-7b show the performance comparisons on the missed detection probability and the false detection probability between the super-FFT RACH preamble detection (or extraction) and the mutli-FFT RACH preamble detection in the present disclosure. As can be seen, the mutli-FFT solution only brings negligible performance degradation in contrast to the super-FFT solution.

Figure 6:
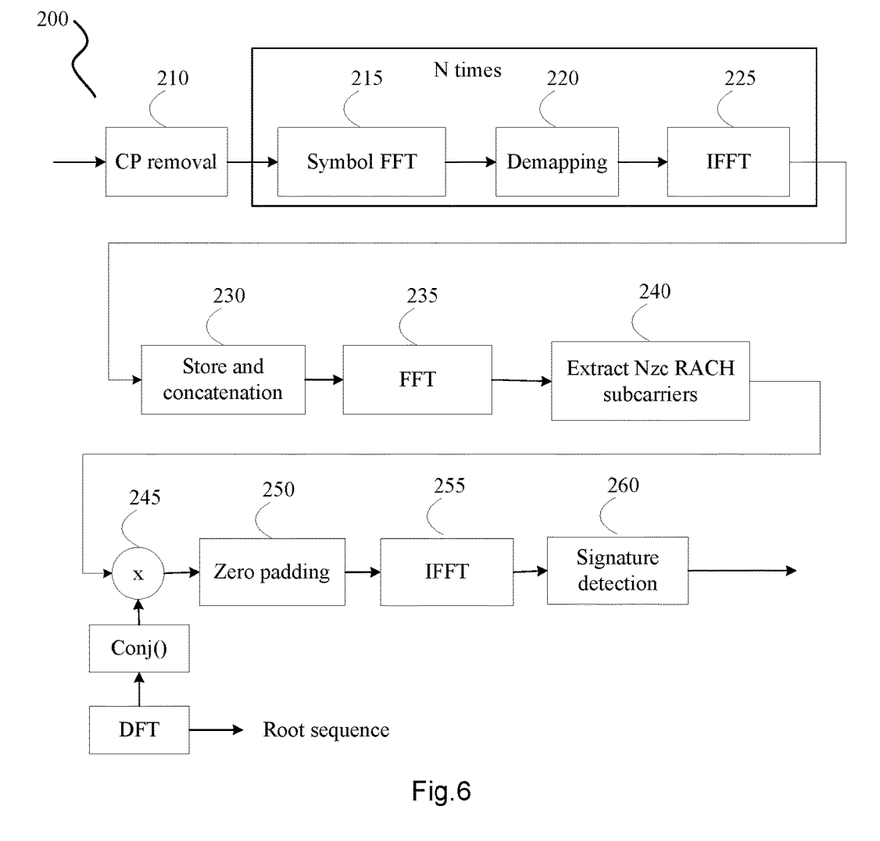
FIG. 6 schematically illustrates an apparatus for extracting a resource block at a frequency band from the uplink signal according to an embodiment.

When the resource block is a RACH preamble, the apparatus 200 may further comprise a multiplying unit 245, a padding unit 250, a second IFFT unit 255 and an obtaining unit 260 as illustrated in FIG. 6.

The multiplying unit 245 is adapted to dot-multiply the extracted subcarriers corresponding to the RACH preamble with a reference sequence. The padding unit 250 is adapted to pad an output of the dot-multiplying with zero. The second IFFT unit 255 is adapted to perform an IFFT on the padded output to generate a time-domain sequence. The obtaining unit 260 is adapted to compute a power delay profile, PDP, of the time-domain sequence and obtain a corresponding preamble ID and uplink timing offset in terms of the peak of the PDP. Since, the process to obtain the preamble ID and uplink timing offset from the extracted subcarriers corresponding to the RACH preamble is know in the art, it will be not be discussed in further detail.

Moreover, the replacement of super-FFT with the mutli-FFT in the present disclosure will cause the phase discontinuity between the neighboring symbols of the plurality of successive symbols. In order to smooth this phase discontinuity, the first FFT unit 215 may apply window function into the FFT of the symbol when performing the FFT on the symbol.

Figure 8:
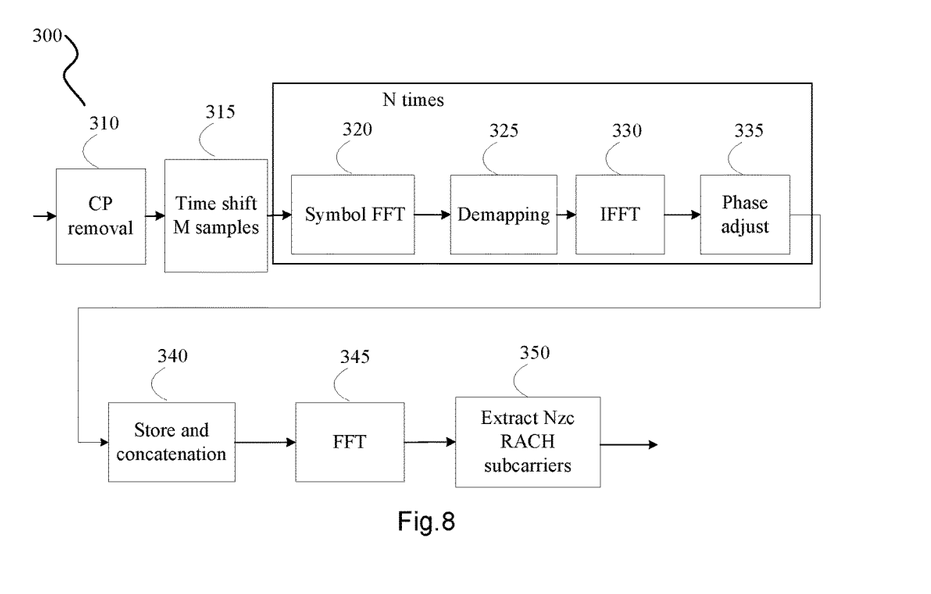
FIG. 8 schematically illustrates an apparatus for extracting a resource block at a frequency band from the uplink signal according to another embodiment.

The phase discontinuity between the neighboring symbols can also be smoothed by adjusting the phase of the successive symbols, which will be discussed with reference to FIG. 8. As shown, the apparatus 300 comprises a second removing unit 310, a shifting unit 315, a third FFT unit 320, a third extracting unit 325, a third IFFT unit 330, an adjusting unit 335, a second storing unit 340, a fourth FFT unit 345 and a fourth extracting unit 350.

The second removing unit 310 is adapted to remove the CP portion corresponding to the resource block from the signal. Here, the second removing unit 310 functions in the same way as the first removing unit 210 in FIG. 5

After the CP portion corresponding to the resource block is removed from the signal, the shifting unit 315 is adapted to perform a predetermined number of sampling point shifts in time domain on the signal. In an embodiment, the predetermined number of the sampling point shifts is half of the predetermined number of the successive symbols for less calculation complexity. For example, if the number of the successive symbols is 12 as described above, then the number of the sampling point shifts will be 12/2=6 sample points.

Subsequently, the third FFT unit 320 is adapted to perform a FFT of each of a predetermined number of successive symbols in the signal. The third extracting unit 325 is adapted to extract a frequency domain signal corresponding to the frequency band at which the resource block is carried from the FFT of the symbol. The third IFFT unit 330 is adapted to perform an IFFT on the extracted frequency domain signal to yield a time domain signal. Here, the third FFT unit 320, the third extracting unit 325 and the third IFFT unit 330 respectively function in the same way as the first FFT unit 215, the first extracting unit 220 and the first IFFT unit 225 in FIG. 5.

The adjusting unit 335 is adapted to adjust phase of the time domain signal based on the sampling point shifts to smooth the phase discontinuity between the successive symbols. For example, if the number of the sampling point shifts is 6 sampling points, and the number of the successive symbols is 12, then the adjusting unit 335 will adjust phase by 6/12=0.5 sampling points for each of the 12 demapped frequency domain signals respectively transformed from the 12 successive time domain symbols.

The second storing unit 340 is adapted to store the adjusted time domain signal for the each of the predetermined number of successive symbols to form a time sequence by concatenation. The fourth FFT unit 345 is adapted to perform a FFT of the stored time sequence. The fourth extracting unit 350 is adapted to extract subcarriers corresponding to the resource block from the FFT of the stored time sequence. Here, the second storing unit 340, the fourth FFT unit 345 and the fourth extracting unit 350 function in the same way as the first storing unit 230, the second FFT unit 235 and the second extracting unit 240 in FIG. 2.

Figure 9:
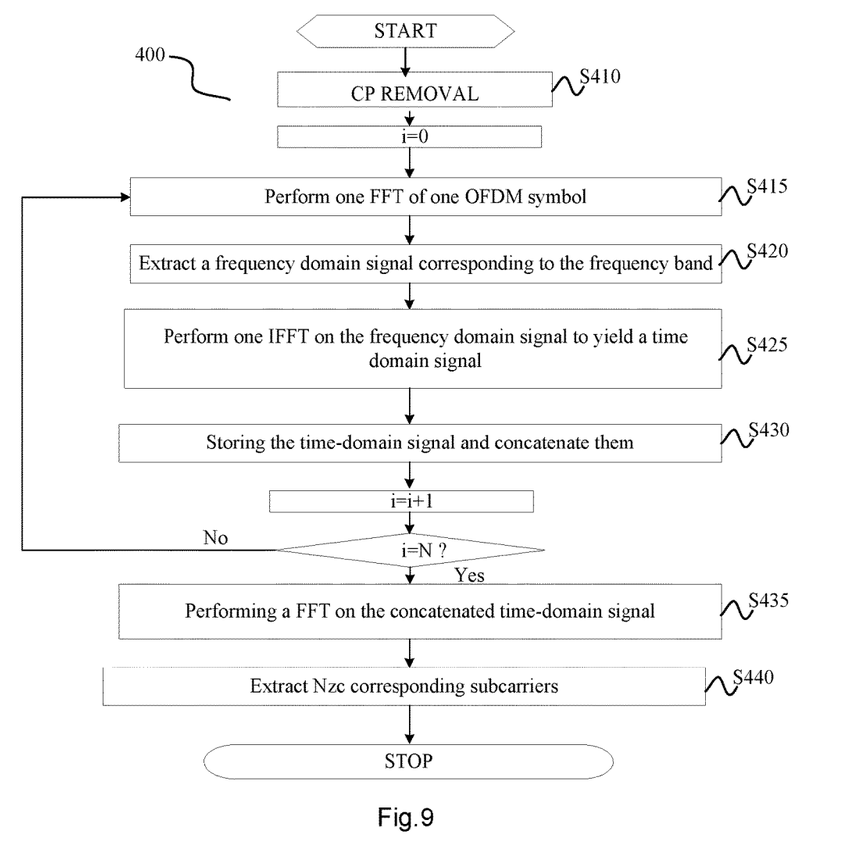
FIG. 9 schematically illustrates a flowchart of a method for extracting a resource block at a frequency band from the uplink signal according to an embodiment.

FIG. 9 schematically illustrates a flowchart of a method 400 for extracting a resource block at a frequency band from the uplink signal according to an embodiment. The method can be performed by the base station such as the base station 110 in FIG. 1. Now the process of the embodiment will be described in detail with reference to the FIG. 9 and FIG. 1.

In step S410, the base station removes a CP portion corresponding to the resource block from the signal received from the terminal device such as the terminal device 120.

Then, the base station may for example partition the signal into a predetermined number of successive symbols. In an embodiment, the number of the successive symbols can be set such that each of the successive symbols contains sampling points in an amount of powers of two (e.g. $2^\alpha$) or powers of two multiplying powers of three and/or powers of five (e.g. $2^\alpha \cdot 3^\beta$, $2^\alpha \cdot 5^\gamma$ or $2^\alpha \cdot 3^\beta \cdot 5^\gamma$), since it is convenient for the symbol to be performed FFT. Take the RACH preamble with the format 0 under 30.72 MHz sampling rate as example, the sequential portion of the RACH preamble has 24576 sampling points in the time domain of the signal. In this case, the number of the successive symbols can be set to 12 (i.e. N=12), since, in this way, each of the successive symbols will contain 2048 (=24576/12), i.e. $2^{11}$ sampling points.

For a predetermined number of successive symbols in the signal after the CP portion corresponding to the resource block has been removed from the signal, the base station performs the steps S415 to S430 for each of the predetermined number of successive symbols:

In step S415, the base station 110 performs a FFT of the symbol. In step S420, the base station extracts a frequency domain signal corresponding to the frequency band at which the resource block is carried, from the FFT of the symbol. In step S425, the base station performs an IFFT on the extracted frequency domain signal to yield a time domain signal. In step S430, the base station stores the yielded time domain signal. As such, each of the successive symbols is transformed to a corresponding time signal stored in the base station. The base station sequentially concatenates the stored time signals corresponding to the successive symbols, and thereby forms a time sequence.

In step S435, the base station performs a FFT of the stored time sequence. Then, the base station extracts subcarriers corresponding to the resource block from the FFT of the stored time sequence in step S440.

Through partitioning the signal received from the UE to a predetermined number of successive symbols, the base station can extract the resource block from the signal by performing a plurality of symbol-level FFT instead of a super FFT. In this way, the base station doesn't necessarily find a large storage space to store the whole signal for performing a super FFT. Instead, it is only required to store a subset of the signal, i.e. the symbol for perform the symbol-level FFT. In addition, the calculation complexity of symbol-level FFTs is significantly lower than that of the super FFT, the processing efficiency is thus improved.

Figure 10:
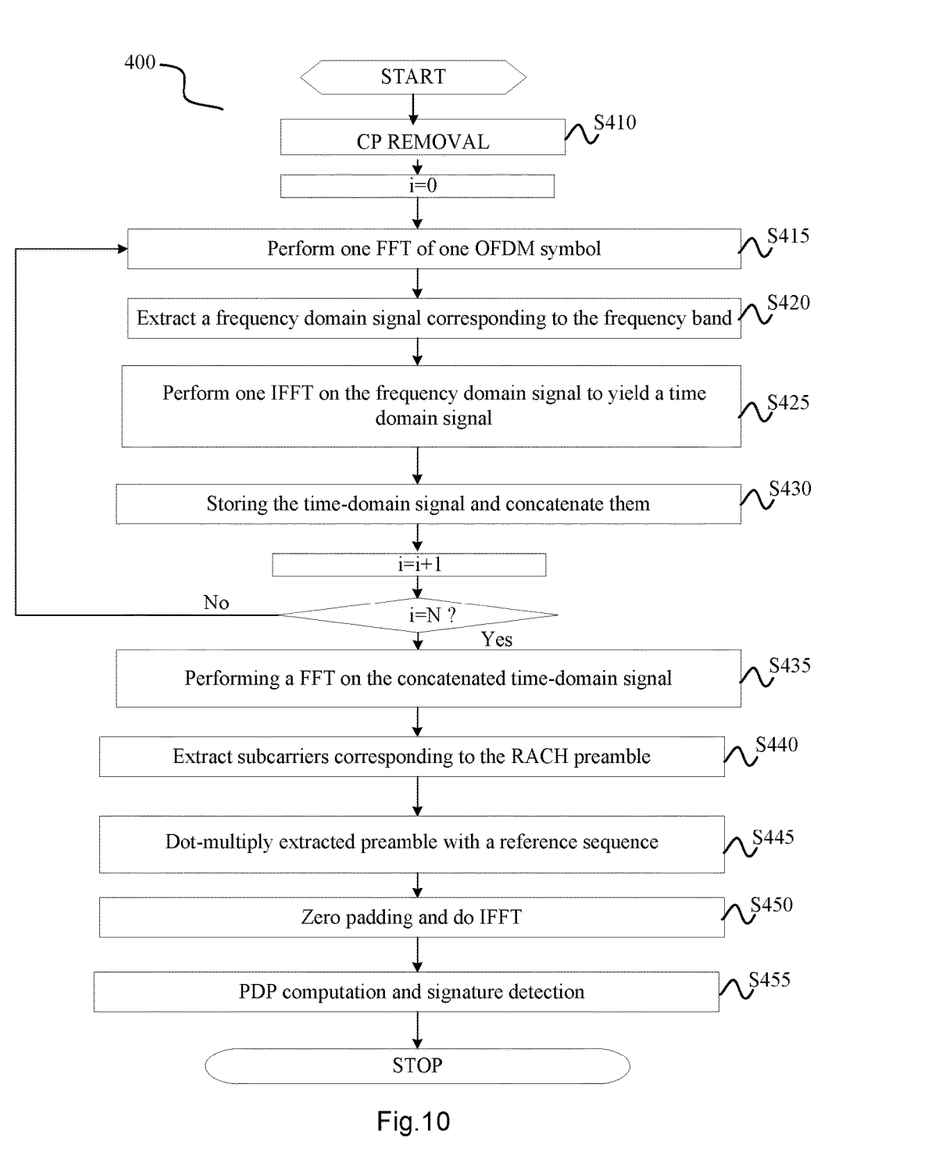
FIG. 10 schematically illustrates a flowchart of a method for extracting a resource block at a frequency band from the uplink signal according to an embodiment.

When the resource block is a RACH preamble, the base station can further performs the steps S445 to S455 as illustrated in FIG. 10. In particular, in step S445, the base station can dot-multiply the extracted subcarriers corresponding to the RACH preamble with a reference sequence. In step S450, the base station pads an output of the dot-multiplying with zero. In step S455, the base station performs an IFFT on the padded output to generate a time-domain sequence, and compute a power delay profile, PDP, of the time-domain sequence and obtain a corresponding preamble ID and uplink timing offset in terms of the peak of the PDP.

Moreover, the replacement of super-FFT with the mutli-FFT in the present disclosure will cause the phase discontinuity between the neighboring symbols of the plurality of successive symbols. In order to smooth this phase discontinuity, the base station may apply window function into the FFT of the symbol when performing the FFT on the symbol in S415.

Figure 11:
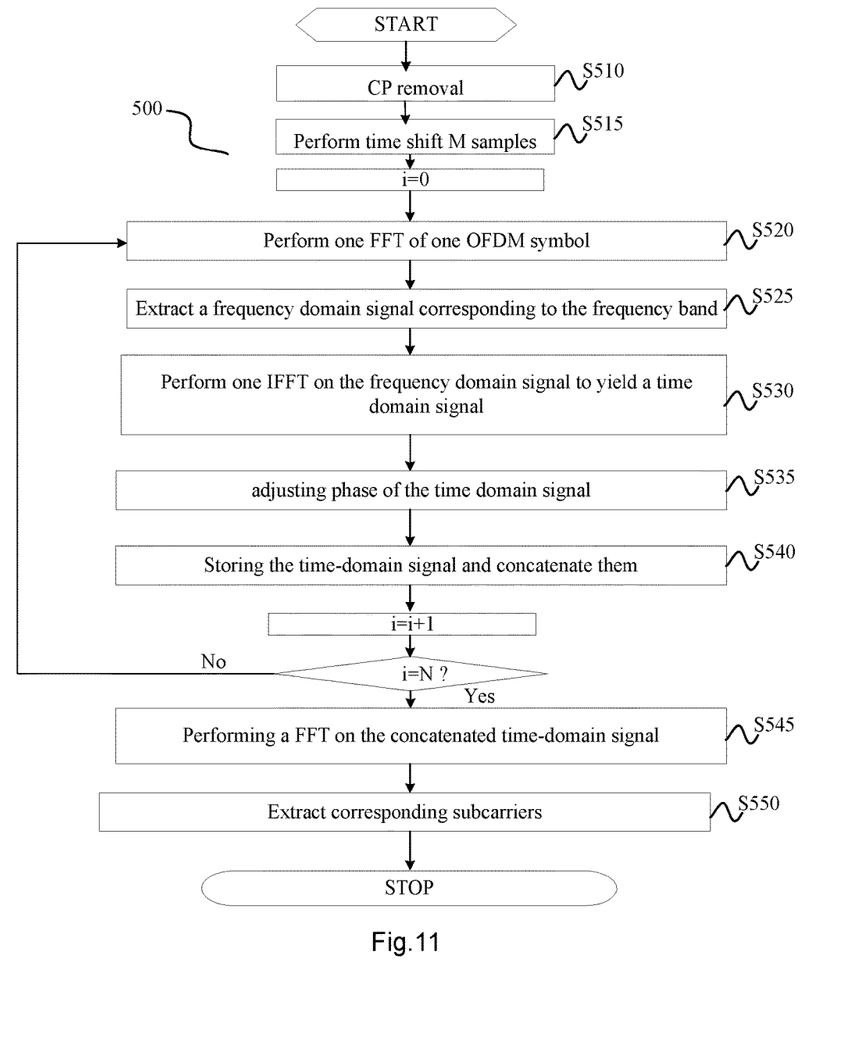
FIG. 11 schematically illustrates a flowchart of a method for extracting a resource block at a frequency band from the uplink signal according to another embodiment.

The phase discontinuity between the neighboring symbols can also be smoothed by adjusting the phase of the successive symbols, which will be discussed with reference to FIG. 11. Now the process of the embodiment illustrated in the FIG. 11 will be discussed.

In step S510, the base station removes the CP portion corresponding to the resource block from the signal. Here, the S510 is performed in the same way as the the step S410 in FIG. 9.

In step S515, the base station performs a predetermined number of sampling point shifts on the signal after the CP portion corresponding to the resource block has been removed from the signal. In an embodiment, the predetermined number of the sampling point shifts is half of the predetermined number of the successive symbols for less calculation complexity. For example, if the number of the successive symbols is 12 as described above, then the number of the sampling point shifts will be 12/2=6 sample points.

For the predetermined number of successive symbols in the signal, the base station performs the steps S520 to S540 for each of the predetermined number of successive symbols:

In step S520, the base station performs a FFT of the symbol. In step S525, the base station extracts a frequency domain signal corresponding to the frequency band from the FFT of the symbol. In step S530, the base station performs an IFFT on the extracted frequency domain signal to yield a time domain signal. In step S535, the base station adjusts phase of the time domain signal based on the sampling point shifts to smooth the phase discontinuity between the successive symbols. For example, if the number of the sampling point shifts is 6 sampling points, and the number of the successive symbols is 12, then the adjusting unit 335 will adjust phase by 6/12=0.5 sampling points for each of the 12 demapped frequency domain signals respectively transformed from the 12 successive time domain symbols. In step S540, the base station stores the adjusted time domain signal. In this way, each of the successive symbols is transformed to a corresponding time signal. The base station sequentially concatenates the time signals corresponding to the successive symbols, and thereby forms a time sequence. Here, the steps S520, S525, S530 and S540 are performed in the same way as the steps S415, S420, S425 and S430 in FIG. 9 respectively.

Subsequently, in step S545, the base station performs a FFT of the stored time sequence. In step S550, the base station extracts subcarriers corresponding to the resource block from the FFT of the stored time sequence. Here, the steps S545 and S550 are performed in the same way as the steps S435 and S440 respectively.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

What is claimed is:

1. A method in a base station for extracting a resource block at a frequency band from a signal received from a terminal device in a radio communication system employing Orthogonal Frequency Division Multiplexing, OFDM, comprising:
    removing a cyclic prefix, CP, portion corresponding to the resource block from the signal;
    performing a Fast Fourier Transform, FFT, of a symbol for a predetermined number of successive symbols in the signal after the CP portion corresponding to the resource block has been removed;
    extracting a frequency domain signal corresponding to the frequency band from the FFT of the symbol;
    performing an Inverse Fast Fourier Transform, IFFT, on the extracted frequency domain signal to yield a time domain signal, wherein the predetermined number of the successive symbols is such that each of the successive symbols comprises sampling points in at least one of an amount of powers of two or powers of two multiplying powers of three and/or powers of five, wherein the performing an IFFT on the extracted frequency signal comprises performing the IFFT on the extracted frequency domain signal using subcarriers that comprise the subcarriers corresponding to the resource block;
    storing the time domain signal to form a time sequence by concatenation;
    performing an FFT of the stored time sequence; and
    extracting subcarriers corresponding to the resource block from the FFT of the stored time sequence, wherein the resource block is a Random Access Channel, RACH, preamble;
    dot-multiplying the extracted subcarriers corresponding to the RACH preamble with a reference sequence;
    padding an output of the dot-multiplying with zero and performing an IFFT on the padded output to generate a time-domain sequence; and
    computing a power delay profile, PDP, of the time-domain sequence and obtaining a corresponding preamble identifier, ID, and uplink timing offset in terms of the peak of the PDP.

2. The method of claim 1, the number of the subcarriers used to perform the IFFT is powers of two or powers of two multiplying powers of three and/or powers of five.

3. The method of claim 1, wherein the step of performing the FFT of the symbol comprises applying window function into the FFT of the symbol.

4. An apparatus to extract a resource block at a frequency band from a signal received in a base station from a terminal device in a radio communication system employing Orthogonal Frequency Division Multiplexing, OFDM, comprising:
    a first removing unit configured to remove a cyclic prefix, CP, portion corresponding to the resource block from the signal;
    a first FFT unit configured to perform a Fast Fourier Transformation, FFT, of each of a predetermined number of successive symbols in the signal, wherein each of the predetermined number of the successive symbols is such that each of the successive symbols comprises sampling points in at least one of an amount of powers of two or powers of two multiplying powers of three and/or powers of five, wherein the performing an IFFT on the extracted frequency signal comprises performing the IFFT on the extracted frequency domain signal using subcarriers that comprise the subcarriers corresponding to the resource block;

a first extracting unit configured to extract a frequency domain signal corresponding to the frequency band from the FFT of the symbol;

a first IFFT unit configured to perform an Inverse Fast Fourier Transformation, IFFT, on the extracted frequency domain signal to yield a time domain signal;

a first storing unit configured to store the time domain signal for the each of the predetermined number of successive symbols to form a time sequence by concatenation;

a second FFT unit configured to perform a FFT of the stored time sequence; and a second extracting unit configured to extract subcarriers corresponding to the resource block from the FFT of the stored time sequence, wherein the resource block is a Random Access Channel, RACH, preamble;

a multiplying unit configured to dot-multiply the extracted subcarriers corresponding to the RACH preamble with a reference sequence;

a padding unit configured to pad an output of dot-multiplying with zero;

a second IFFT unit configured to perform an IFFT on the padded output to generate a time-domain sequence; and an obtaining unit configured to compute a power delay profile, PDP, of the time-domain sequence and obtain a corresponding preamble ID and uplink timing offset in terms of the PDP.

5. An apparatus for extracting a resource block at a frequency band from a signal received in a base station from a terminal device in a radio communication system employing Orthogonal Frequency Division Multiplexing, OFDM, comprising a processor and a memory, said memory containing instructions executable by said processor whereby said apparatus is operative to:

remove a cyclic prefix, CP, portion corresponding to the resource block from the signal;

perform a Fast Fourier Transformation, FFT, of a symbol for a predetermined number of successive symbols in the signal after the CP portion corresponding to the resource block has been removed;

extract a frequency domain signal corresponding to the frequency band from the FFT of the symbol;

perform an Inverse Fast Fourier Transformation, IFFT, on the extracted frequency domain signal to yield a time domain signal, wherein the predetermined number of the successive symbols is such that each of the successive symbols comprises sampling points in at least one of an amount of powers of two or powers of two multiplying powers of three and/or powers of five, wherein the performing an IFFT on the extracted frequency signal comprises performing the IFFT on the extracted frequency domain signal using subcarriers that comprise the subcarriers corresponding to the resource block; and store the time domain signal to form a time sequence by concatenation;

perform a FFT of the stored time sequence;

extract subcarriers corresponding to the resource block from the FFT of the stored time sequence, wherein the resource block is a Random Access Channel, RACH, preamble;

dot-multiplying the extracted subcarriers corresponding to the RACH preamble with a reference sequence;

padding an output of the dot-multiplying with zero and performing an IFFT on the padded output to generate a time-domain sequence; and computing a power delay profile, PDP, of the time-domain sequence and obtaining a corresponding preamble identifier, ID, and uplink timing offset in terms of the peak of the PDP.

* * * * *